(12) United States Patent
Aharoni

(10) Patent No.: US 12,496,186 B1
(45) Date of Patent: Dec. 16, 2025

(54) SECONDARY HAPTIC LOOPS FOR FIXATION OF INTRAOCULAR DEVICE

(71) Applicant: Eli Aharoni, Tel Aviv (IL)

(72) Inventor: Eli Aharoni, Tel Aviv (IL)

(*) Notice: Subject to any disclaimer, the term of this patent is extended or adjusted under 35 U.S.C. 154(b) by 0 days.

(21) Appl. No.: 19/007,500

(22) Filed: Jan. 1, 2025

(51) Int. Cl.
*A61F 2/16* (2006.01)
*A61B 17/06* (2006.01)
*A61B 17/04* (2006.01)

(52) U.S. Cl.
CPC .......... *A61F 2/16* (2013.01); *A61B 17/06166* (2013.01); *A61B 2017/0409* (2013.01); *A61B 2017/0464* (2013.01); *A61F 2002/1681* (2013.01); *A61F 2220/0008* (2013.01)

(58) Field of Classification Search
None
See application file for complete search history.

(56) References Cited

U.S. PATENT DOCUMENTS 4,409,690 A * 10/1983 Gess .................. A61F 2/15
623/6.43

2002/0091442 A1 * 7/2002 Snyder ................ A61F 2/16
623/6.47
2006/0235430 A1 * 10/2006 Le ..................... A61F 2/148
606/107
2012/0130389 A1 * 5/2012 Prywes ............ A61F 9/00736
606/107

FOREIGN PATENT DOCUMENTS

WO WO-2023033648 A1 * 3/2023 ......... A61F 9/00709

OTHER PUBLICATIONS

Surtex, "Kuglen Lens Manipulating Hook", https://surtex-instruments.com/product/kuglen-lens-manipulating-hook/, downloaded Jun. 20, 2025. (Year: 2025).*

* cited by examiner

*Primary Examiner* — Leslie A Lopez
(74) *Attorney, Agent, or Firm* — Dekel Patent Ltd.; David Klein

(57) ABSTRACT

An intraocular assembly includes an intraocular device that includes at least one haptic, and a secondary haptic loop including two ends that are coupled to the at least one haptic, the secondary haptic loop being made of a material which can be tied.

8 Claims, 8 Drawing Sheets

SECONDARY HAPTIC LOOPS FOR FIXATION OF INTRAOCULAR DEVICE

FIELD OF THE INVENTION

The present invention relates generally to intraocular devices, and particularly to secondary haptic loops for fixation of an intraocular device.

BACKGROUND OF THE INVENTION

An intraocular lens (IOL) is most often placed in the capsular bag so that the natural bag that held the human lens now holds the IOL. However, there are conditions in which IOL implantation in the capsular bag is not an option, such as where there is inadequate capsular support, for example in a procedure of lens exchange, where the bag is damaged or remnants of the bag interfere with IOL implantation or other situations in which IOL implantation in the capsular bag is impossible. Other examples of such conditions include subluxation or dislocation of the lens (ectopia lentis) or cases of post-surgical aphakia due to intracapsular cataract extraction surgery, or complications of cataract surgery such as bag dialysis, zonular dialysis, loose zonules, and large posterior capsular rupture, or if an IOL had been placed in the bag previously.

Accordingly, in lens exchange procedures for a pseudophakic patient, in cases where capsular lens fixation is not an option, the IOL may be placed in the ciliary sulcus (or simply the sulcus).

Galilean Implantable Telescopes are designed to correct problems stemming from central field defects, such as those caused by macular degeneration.

The need for an Implantable Telescope often arises for pseudophakic patients where a regular IOL has already been implanted. In those cases Lens Exchange procedure should take place, and risks of damaging the capsular bag is often accrued during the attempt of remove the regular IOL and implant in its place an Implantable Telescope.

The tendency for decentration and tilting increases when IOL is implanted in the sulcus during lens exchange procedure; placing haptics of an Implantable Telescope in the sulcus like suturing an IOL is a risky solution, because the Implantable Telescope is very sensitive to decentration (misalignment with the central optic axis of the eye) and tilting (angular displacement of the focus of the Implantable Telescope).

Another risk that needs attention is intraocular manipulation, in which excess devices and materials are manipulated inside the anterior chamber during intraocular surgery. Moreover, the volume and surgical time that these risky elements remain intraocularly inside the eye are critical for this type of risk. Consequently, scleral suturing of IOL requires manipulation and can cause damage to the corneal endothelium cells. The risk of damaging the endothelium cells significantly increases when, in addition to the above-mentioned suturing, more actions must be performed inside the ocular eye. One example of such risks is in a lens exchange process, in which there are manipulation actions of old IOLs extraction, especially where fibrotic materials exist, and in which wide-dimensional surgical cuts are required to extract the old lens or shear it intraocularly. Another example of such risks is the case of scleral suturing in order to fixate a telescopic lens, in which three haptics are to be sutured compared to two haptics in regular IOLs. Since the telescopic lens has a much greater intraocular volume than regular IOLs, the risk of endothelium loss is significantly more dangerous than regular IOLs.

SUMMARY

The present invention seeks to provide a novel structure, namely, secondary haptic loops, which allows for easy fixation of intraocular devices, as described in detail below. The secondary haptic loops allow easy and correct placement of the intraocular device and allow for accurate adjustment of lens tilt and decentration. The invention can be used to mount any kind of IOL or other intraocular device into the sclera, and is especially useful for inserting an intraocular device in an aphakic eye, such as in a difficult case of lens exchange procedure.

There is provided in accordance with a non-limiting embodiment of the invention an intraocular assembly including an intraocular device that includes at least one haptic, and a haptic loop including two ends that are coupled to the at least one haptic, the secondary haptic loop being made of a material which can be tied, such as but not limited to, a thread elastomer, for example, polypropylene (PROLENE).

In accordance with a non-limiting embodiment of the invention the ends of the haptic loop pass from a first side of the at least one haptic through apertures formed in the at least one haptic to a second side of the at least one haptic, and each of the ends includes a blocking structure configured to prevent the secondary haptic loop from being pulled out of the aperture.

In accordance with a non-limiting embodiment of the invention the blocking structure includes a flange or bulb. In accordance with a non-limiting embodiment of the invention the first side of the at least one haptic includes an anterior side, or alternatively, a posterior side of the device original haptic.

In accordance with a non-limiting embodiment of the invention the ends of the secondary haptic loop are formed integrally as part of the at least one haptic.

In accordance with a non-limiting embodiment of the invention the intraocular device includes more than one haptic, and at least one of the secondary haptic loops protrudes further away from its haptic than others of the secondary haptic loops.

In accordance with a non-limiting embodiment of the invention the circumferential distance between the apertures may be equal or different for all the haptics of the intraocular device In accordance with a non-limiting embodiment of the invention a radial distance from each of the apertures to a center of the intraocular device is equal.

In accordance with a non-limiting embodiment of the invention a radial distance from each of the apertures to a center of the intraocular device is not equal.

In accordance with a non-limiting embodiment of the invention the intraocular device includes more than one haptic, and a radial distance from at least one of the apertures to a center of the intraocular device is not equal to a radial distance from another one of the apertures to the center of the intraocular device.

There is provided in accordance with a non-limiting embodiment of the invention a method of introducing an intraocular assembly into an eye includes providing an intraocular device that includes at least one haptic, and a secondary haptic loop comprising two ends that are coupled to the at least one haptic, the secondary haptic loop being made of a material which can be tied, and providing instructions to:

use an injector to introduce the intraocular device into an eye, wherein the secondary haptic loop protrudes from a distal end of the injector;

use a hook tool which has been inserted through a sclerotomy puncture to snare the secondary haptic loop and pull the secondary haptic loop through the sclerotomy puncture;

use a cutting tool to cut the secondary haptic loop to create two suture ends;

and use a grasping tool to pull the two suture ends to position the intraocular device at a desired position and form blocking structure on the two suture ends to fix the suture ends in the eye.

In accordance with a non-limiting embodiment of the invention before using the grasping tool, the two suture ends are formed with temporary flanges or bulbs to prevent the two suture ends from entering back into the sclerotomy puncture.

In accordance with a non-limiting embodiment of the invention the intraocular device includes more than one haptic, and at least one of the secondary haptic loops, called a larger secondary haptic loops, protrudes further away from its haptic than others of the secondary haptic loops, and the larger secondary haptic loops is snared and pulled before the other haptic loops.

In accordance with a non-limiting embodiment of the invention if there is a need to overcome inaccuracies in a placement of the intraocular device, then further including pulling one of the two sutures in each one of the sclerotomy ends more than the other suture end to achieve proper geometrical position of the intraocular device.

BRIEF DESCRIPTION OF DRAWINGS

The present invention will be understood and appreciated more fully from the following detailed description, taken in conjunction with the drawings in which:

FIG. 3 shows step A, in which the loop has been snared by the hook tool and pulled through a sclerotomy puncture, and the loop is about to be cut by a cutting tool to create two cut ends. FIG. 3 shows step B, in which the two cut ends are cauterized, such as by a handheld cautery, to form temporary flanges or bulbs to prevent the loop ends from entering back into the sclerotomy puncture, thereby preventing the intraocular device from falling into the vitreous humor. FIG. 3 shows step C, in which a grasping tool grasps the two cut ends at each of the three haptics and pulls them taut to properly position the intraocular device in the posterior chamber, so that the intraocular device fine-tuned against decentered or tilted position. In the illustrated embodiment, there were three extracted secondary loops that cut and cauterized to six sutures end, alternatively each couple ends can be cauterized together) to form permanent flanges or bulbs. In step D, for each pair of sutures, one of the sutures may be pulled more than the other suture, if needed, to help achieve a fine tuning position of the intraocular device so it is not decentered or tilted.

DETAILED DESCRIPTION

Figure 1A:
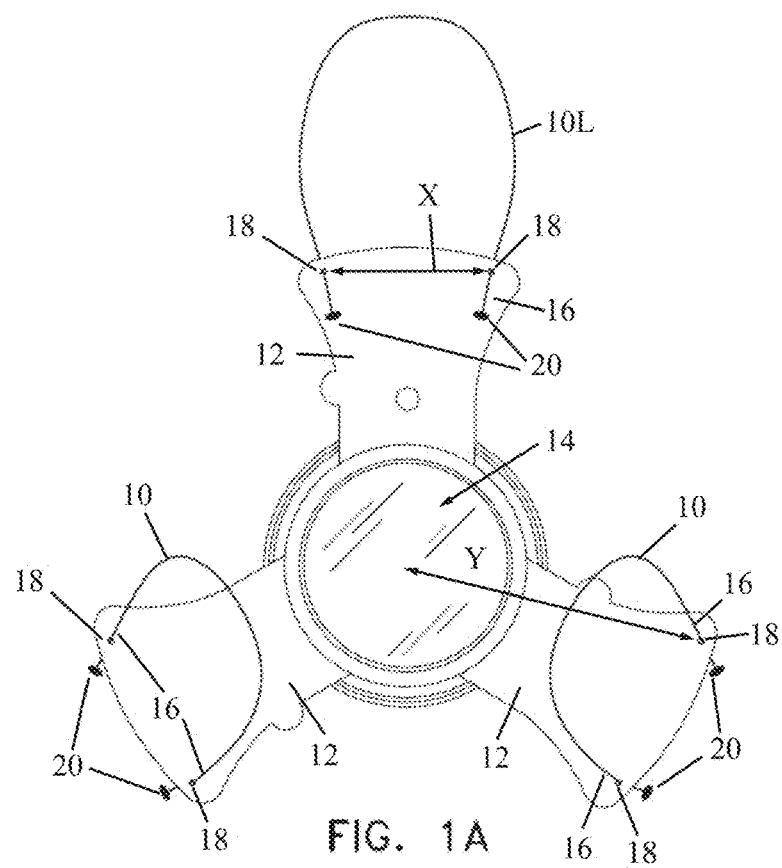
FIG. 1A is a simplified top view illustration of secondary haptic loops coupled to haptics of an intraocular device (such as a SING IMT, that is, a smaller-incision new generation implantable miniature telescope, with vaulted haptics), in accordance with a non-limiting embodiment of the invention.
Figure 1B:
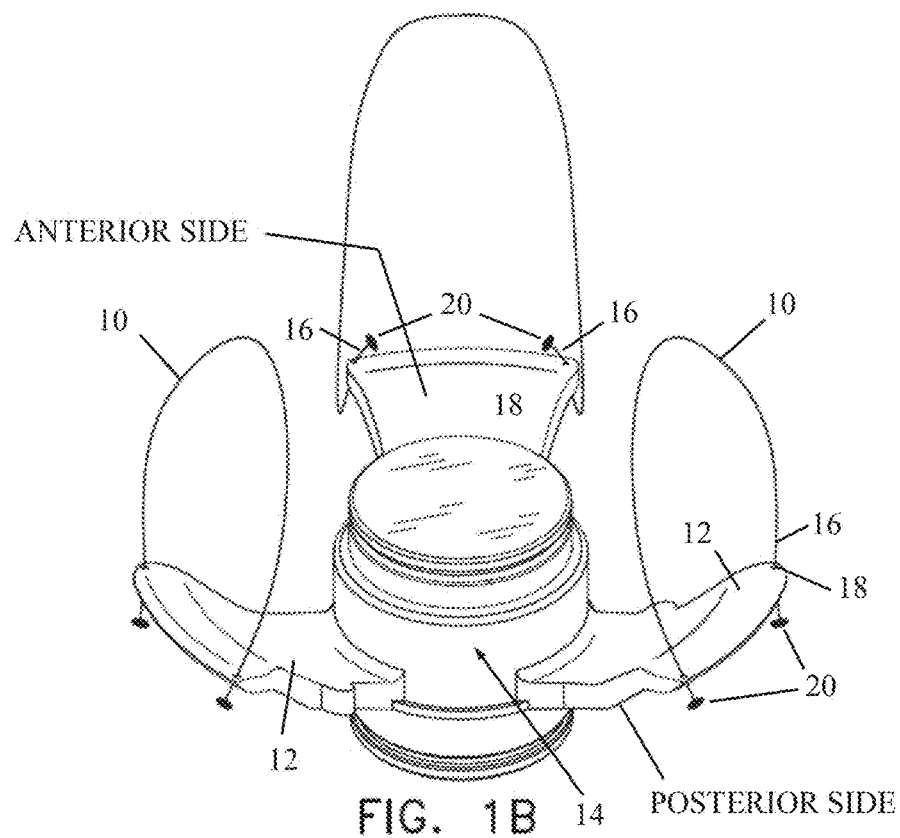
FIG. 1B is a simplified perspective illustration of the secondary haptic loops coupled to the haptics of the intraocular device.

Reference is now made to FIGS. 1A and 1B, which illustrate secondary haptic loops 10 (or simply haptic loops or loops 10) coupled to haptics 12 of an intraocular device 14, in accordance with a non-limiting embodiment of the invention.

In the non-limiting illustrated embodiment, intraocular device 14 is a SING IMT, that is, a smaller-incision new generation implantable miniature telescope, with vaulted haptics 12. However, the invention is not limited to this particular type of intraocular device or type of haptic, and the invention can be carried out with other kinds of intraocular devices and haptics (one example being shown and described below with reference to FIG. 4). In the non-limiting illustrated embodiment, there are three haptics 12, but the invention is not limited to any number of haptics (in FIG. 4, for example, there are two haptics).

Figure 1C:
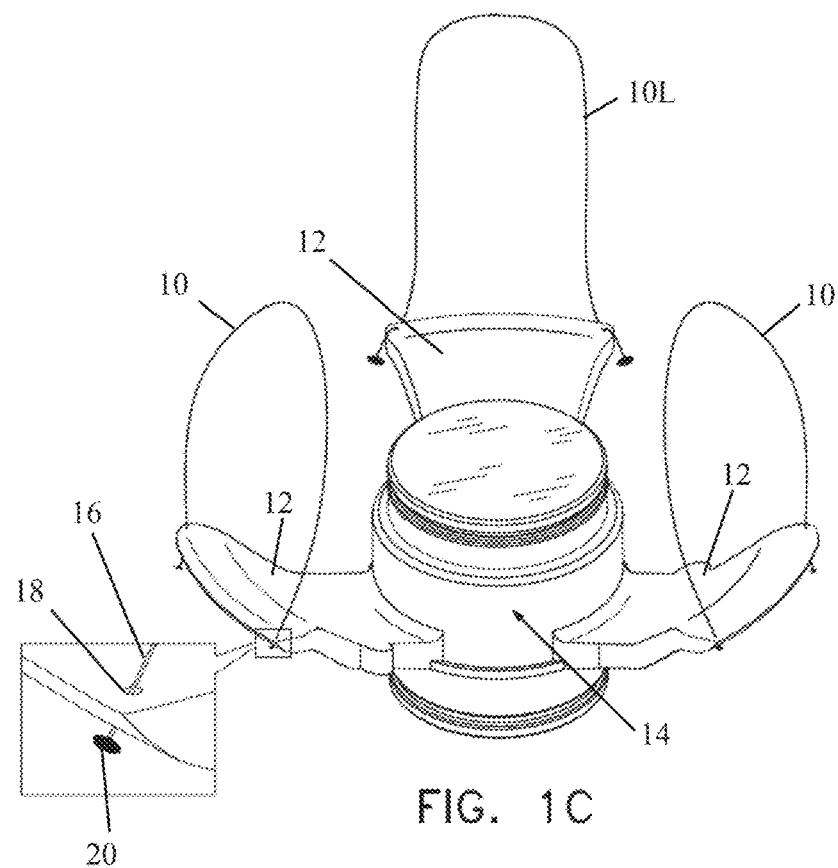
FIG. 1C is a simplified perspective illustration of the secondary haptic loop coupled to the haptic by threading the loop through an aperture in one side of the haptic and creating a flange or bulb on the other side of the haptic (such as by using a handheld cautery) to prevent the loop from being pulled out of the aperture.

Loops 10 may be made of an elastomer, such as nylon or polypropylene (such as PROLENE sutures), or any other suitable material for tying and/or attaching in a surgical procedure. Each loop 10 has two ends 16 which are coupled to the haptic 12. In FIGS. 1A, 1B and 1C, the ends 16 are coupled to the haptic 12 by passing from one side of the haptic through an aperture 18 to the other side of the haptic. The end that has passed through aperture 18 may be cauterized to form a flange or bulb 20 in order to prevent the loop from being pulled out of the aperture 18. (Whether the anterior or posterior side is cauterized may be different for one of the loops, as is explained below.) Although it is preferable that the loop material can be cauterized, this is not essential to the invention, and instead a knot or knots can be formed at the end of the loop end 16, or a small clip or other fastener attached thereto for example, to prevent the loop from being pulled out of the aperture 18. All of these structures that prevent the loop from being pulled out of the aperture are referred to as blocking structure.

Figure 1D:
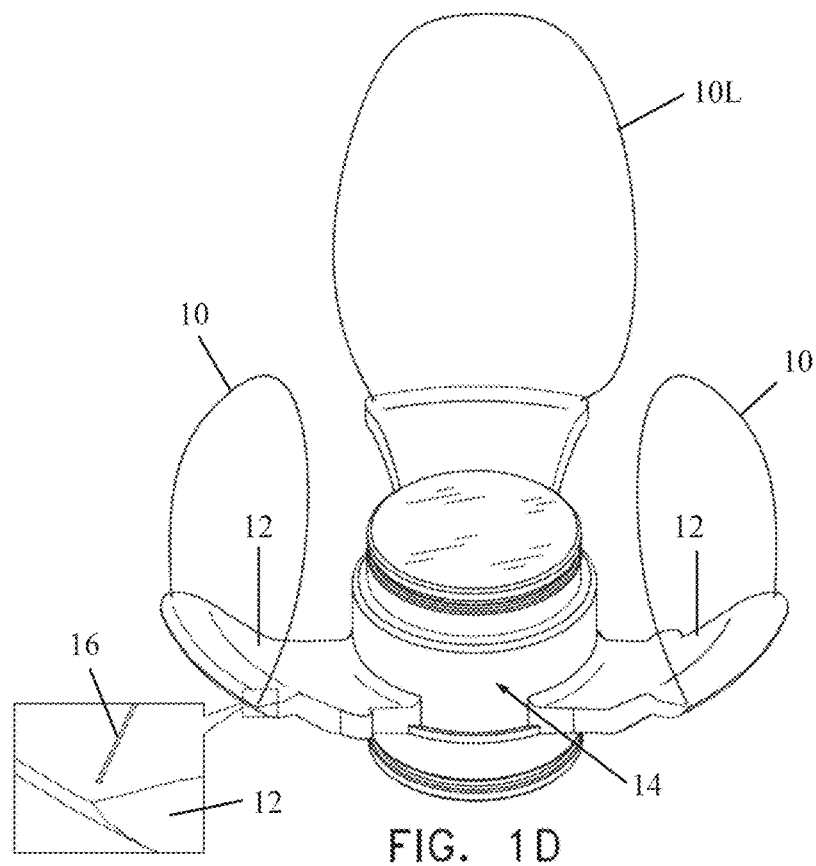
FIG. 1D is a simplified perspective illustration of the secondary haptic loop coupled to the haptic by being an integral part of the haptic (such as the loop and haptic being molded as one piece).

Alternatively, as shown in FIG. 1D, the haptic loop 10 may be coupled to the haptic 12 by being an integral part of the haptic, such as the loop and haptic being molded as one piece from a polymer or other material.

It can be seen especially in FIGS. 1B and 1D, in accordance with a non-limiting embodiment of the invention, one of the loops 10, designated as larger loop 10L, may be larger than the other loops. "Larger" means the loop protrudes further away from the haptic. An advantage to having a larger loop at a "leading haptic" will be appreciated below with reference to FIG. 2A.

In accordance with a non-limiting embodiment of the invention, for each haptic, the circumferential distance X (FIG. 1A) between apertures 18 for mounting the loops can be equal or can be different for different haptics. Similarly, the radial distance Y from each aperture 20 to the center of the intraocular device 14 may be equal, or the distance can be different for different haptics or can be different for the two apertures on the same haptic.

Figure 2A:
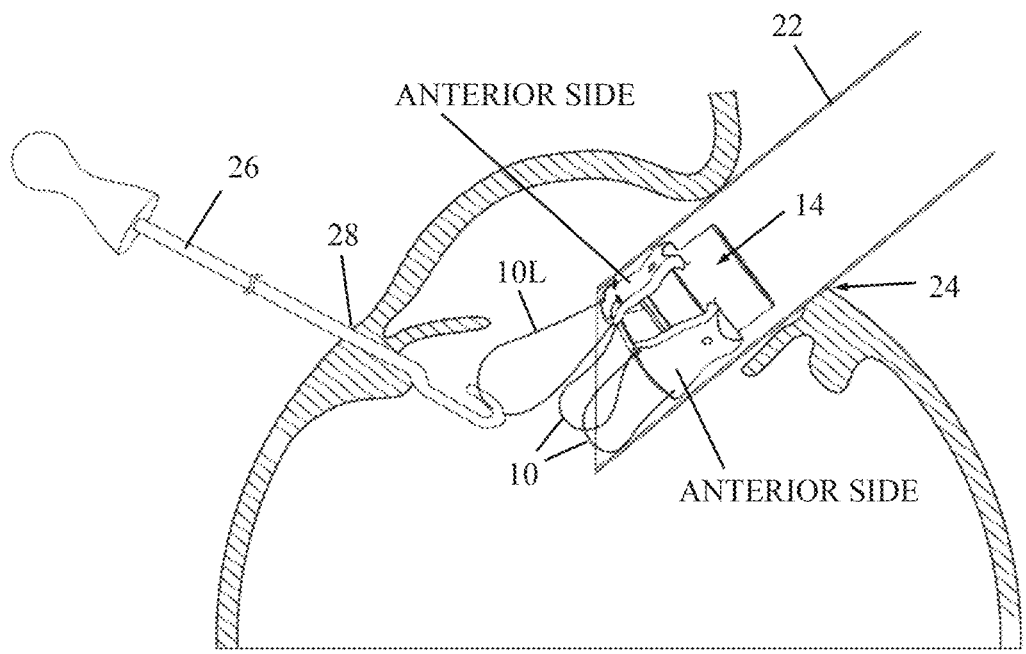
FIG. 2A is a simplified sagittal view illustration of an injector (such as a preloaded injector) being introduced through a limbal cut incision (e.g., a limbal incision; the term incision includes any cut or puncture, or other kinds of incision), wherein the intraocular device has been loaded in the injector and at least one of the secondary leading loops protrudes from the proximal end of the injector so it is snared by a hook tool which has been inserted through the distal sclerotomy puncture, in accordance with a non-limiting embodiment of the invention. The hook tool will be used to pull the loop through the sclerotomy puncture, and as shown in FIG. 3, the loop will be cut to create two suture ends which will be cauterized to form flanges or bulbs.
Figure 3:
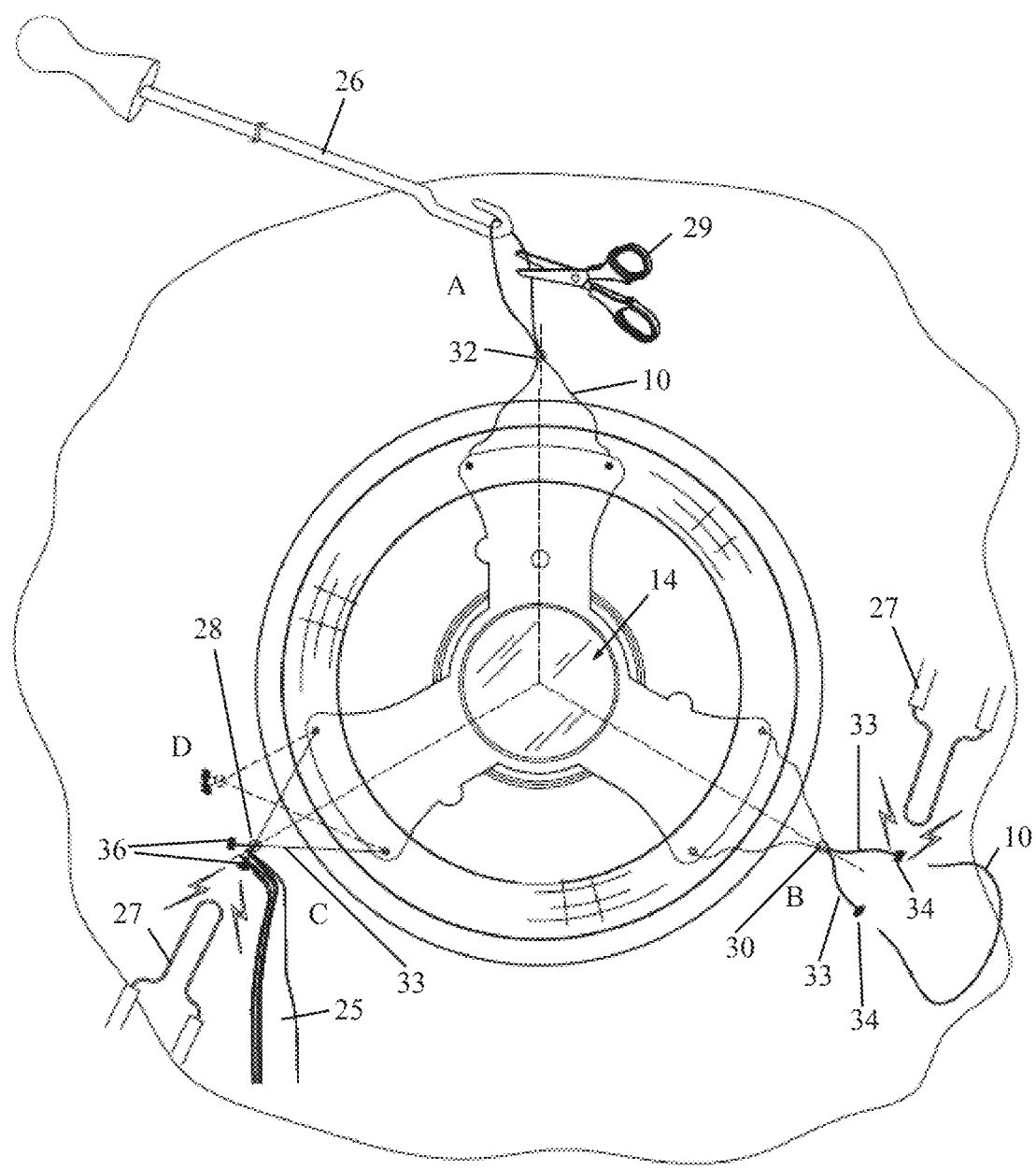
FIG. 3 is a simplified anterior view illustration of the intraocular device mounting process in the posterior chamber. The three loops have been pulled through three sclerotomy punctures at the 12, 4 and 8 o'clock (0:00, 4:00, 8:00) positions, that is, 120° apart, or other divisional positions.

Reference is now made to FIG. 2A. In the illustration, the eye is aphakic, meaning a previous IOL has been removed in a lens exchange procedure, or the natural lens has been removed. An injector 22 (such as a preloaded injector) is introduced through an incision, such as but not limited to, a limbal, scleral, or corneal cut 24. The intraocular device 14 has been loaded in the injector 22 and at least one of the loops 10, preferably but not necessarily, larger loop 10L, protrudes from the distal end of injector 22 so it can be snared by a hook tool 26 which has been inserted through a sclerotomy puncture 28. The hook tool 26 will be used to pull the loop 10L through the sclerotomy puncture 28, and as shown in FIG. 3, the loop will be cut to create two suture ends which will be cauterized to form one united or separate flanges or bulbs.

Some advantages of the novel loops are now explained. First, if regular sutures (with no loops) were used instead of loops, it would be more difficult to grasp them and pull them through the puncture. Second, if regular sutures were used instead of loops, when the intraocular device 14 is injected into the anterior or posterior chamber, the sutures could easily get entangled with each other (a "spaghetti effect"), making it difficult if not impossible to pull them to the correct directions. Third, by using a larger loop, the larger loop is the one that protrudes more out of the distal end of the injector and it is much easier to grasp by the hook tool.

Figure 2B:
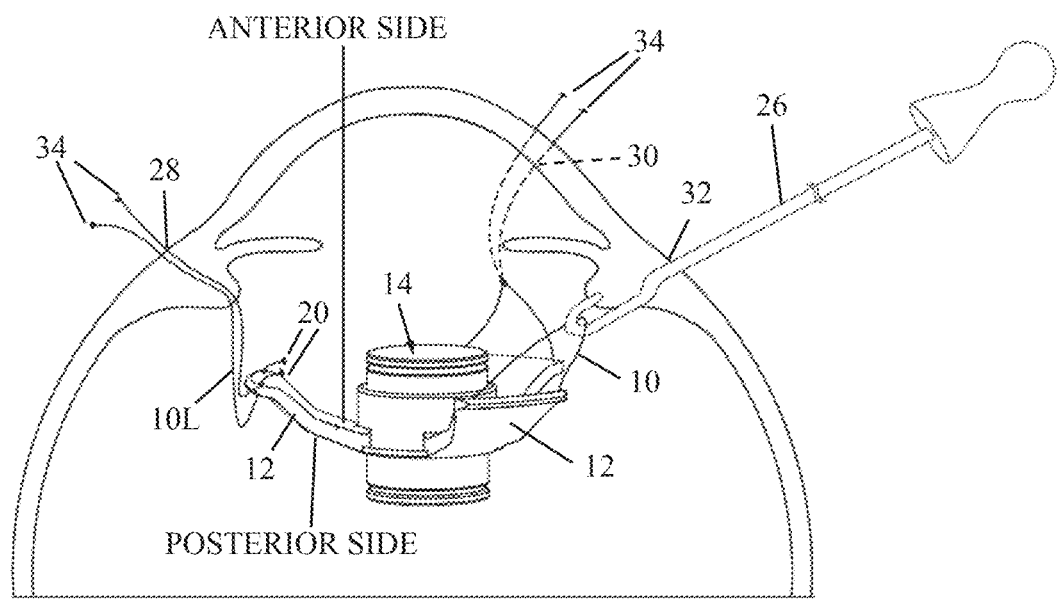
FIG. 2B is a simplified sagittal view illustration of the intraocular device introduced into the posterior chamber. Two loops have already been pulled through two different sclerotomy punctures (e.g., limbal, scleral, corneal or any other suitable incision), cut and cauterized to form temporary flanges or bulbs (as shown in FIG. 3), and the third loop is shown being snared by the hook tool that has been introduced through a third sclerotomy puncture. The third loop will eventually be pulled through that sclerotomy puncture, cut and cauterized to form temporary flanges or bulbs.

Another advantage is the following. As noted above, the ends 16 are coupled to the haptic 12 by passing from one side of the haptic through aperture 18 to the other side of the haptic. The end that has passed through aperture 18 may be cauterized to form a flange or bulb 20 to prevent the loop from being pulled out of the aperture 18. As seen in FIGS. 1B, 2A and 2B, a further advantage is that for the first loop that is snared, such as larger loop 10L, the flange or bulb 20 may be formed on the anterior side of the haptic, so that pulling the larger loop pulls the intraocular device 14 in the correct direction. For the other loops the flange or bulb 20 may be formed on the posterior side of the haptic.

Reference is now made to FIG. 2B. The intraocular device 14 has been introduced into the posterior chamber. As described before, larger loop 10L has already been pulled through sclerotomy (puncture) 28. The larger loop 10L has been cut and cauterized to form temporary flanges or bulbs 34 (as shown in FIG. 3). Another secondary haptic loop 10 has been pulled through a different sclerotomy puncture 30 and cauterized to form temporary flanges or bulbs 34 (as shown in FIG. 3). The third loop is shown being snared by the hook tool 26 that has been introduced through a third sclerotomy puncture Reference is now made to FIG. 3. The intraocular device 14 is mounted in the posterior chamber. The three loops 10 have been pulled through three sclerotomy punctures 32, 30, and 28, at the 12, 4 and 8 o'clock (0:00, 4:00, 8:00) positions, respectively, that is, 120° apart, or other divisional positions.

FIG. 3 shows steps A, B, and C, which are performed for each loop. FIG. 3 also shows optional step D, which may be performed to overcome inaccuracies in the placement of the intraocular device, such as but not limited to, due to inaccuracies in the placement of the sclerotomy punctures.

In step A, loop 10 has been snared by hook tool 26 and pulled through sclerotomy puncture 32. The loop 10 is about to be cut by a cutting tool 29 to create two cut ends.

In step B, the two cut ends 33 are cauterized either one by one or joined together, such as by a handheld cautery 27, to form temporary flanges or bulbs 34 to prevent the loop ends from entering back into the sclerotomy puncture, thereby preventing the intraocular device from falling into the vitreous humor.

In step C, (this step is relevant to each of the sclerotomies and can be done simultaneously in all three sclerotomies) a grasping tool 25 (e.g., forceps or tweezers) grasps the two cut ends 33 at each of the three haptics and pulls them taut to properly position the intraocular device 14 in the posterior chamber, so that the intraocular device 14 is not decentered or tilted. Each cut end 33 or suture (in the illustrated embodiment, since there were three loops there are a total of six sutures) is cauterized to form permanent flanges or bulbs 36. If done properly, the intraocular device 14 is held tightly in the posterior chamber and is not decentered or tilted. If there is a need to overcome inaccuracies, such as in the placement of the sclerotomy punctures, then in step D, for each pair of sutures, one of the sutures may be pulled more than the other suture, if needed, to help achieve proper position of the intraocular device 14 so it is not decentered or tilted.

Figure 4:
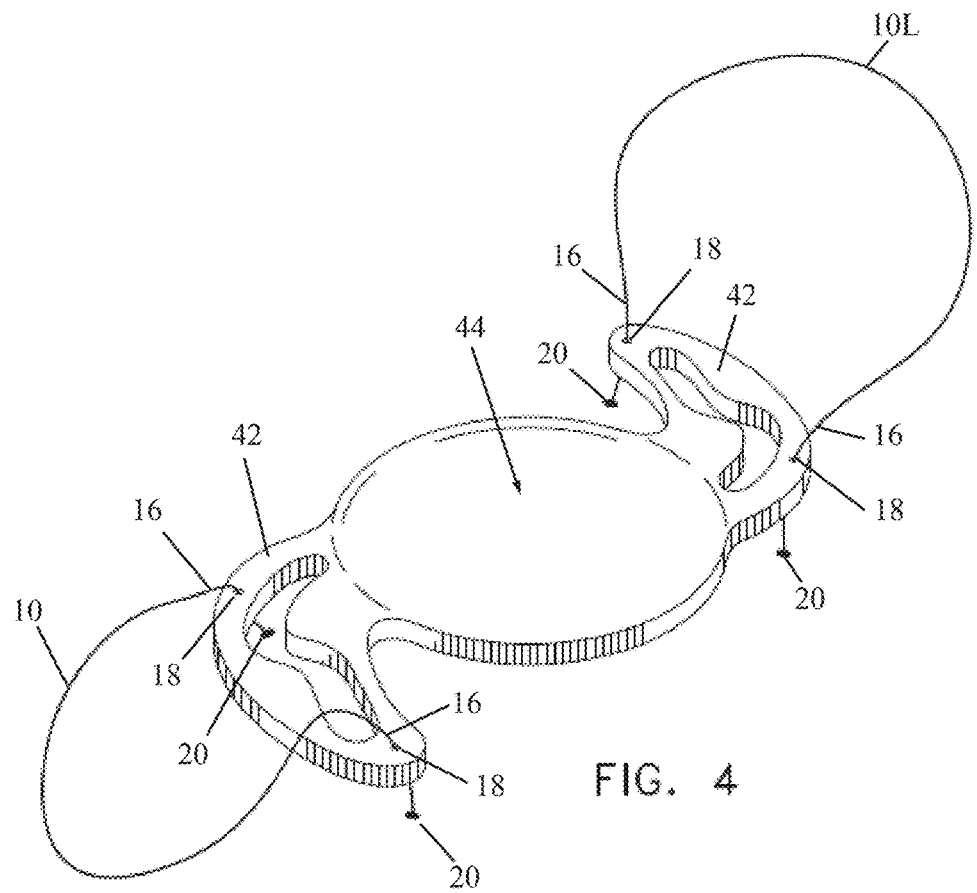
FIG. 4 is a simplified perspective illustration of secondary haptic loops coupled to haptics of another intraocular device (such as a foldable and injectable IOL), in accordance with another non-limiting embodiment of the invention.

Reference is now made to FIG. 4, which illustrates the secondary haptic loops 10 coupled to haptics 42 of another intraocular device 44, such as a foldable and injectable cataract IOL with haptics 42, in accordance with another non-limiting embodiment of the invention. As with the other embodiments of the invention, the loops 10 may have ends 16 which are coupled to the haptic 42, such as by passing from one side of the haptic through aperture 18 to the other side of the haptic, or by being an integral piece of the haptic. The loop may be coupled to any portion of the haptic, even at the edge of the haptic.

Figure 5:
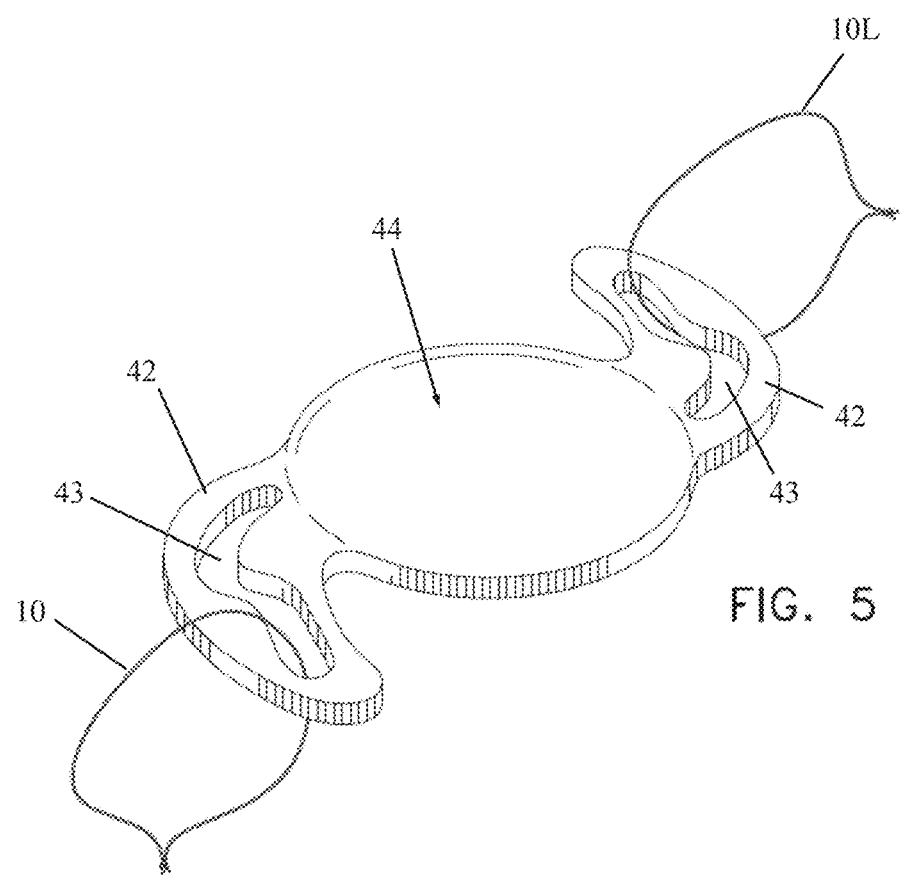
FIG. 5 is a simplified illustration of the secondary haptic loops looped through openings formed in the haptics, in accordance with a non-limiting embodiment of the invention.

Reference is now made to FIG. 5, which illustrates the secondary haptic loops 10 coupled to haptics 42 by looping them through openings 43 of the haptics 42 (instead of ends of the second haptic loops passing through relatively small apertures 18, as in previous embodiments).

Figure 6:
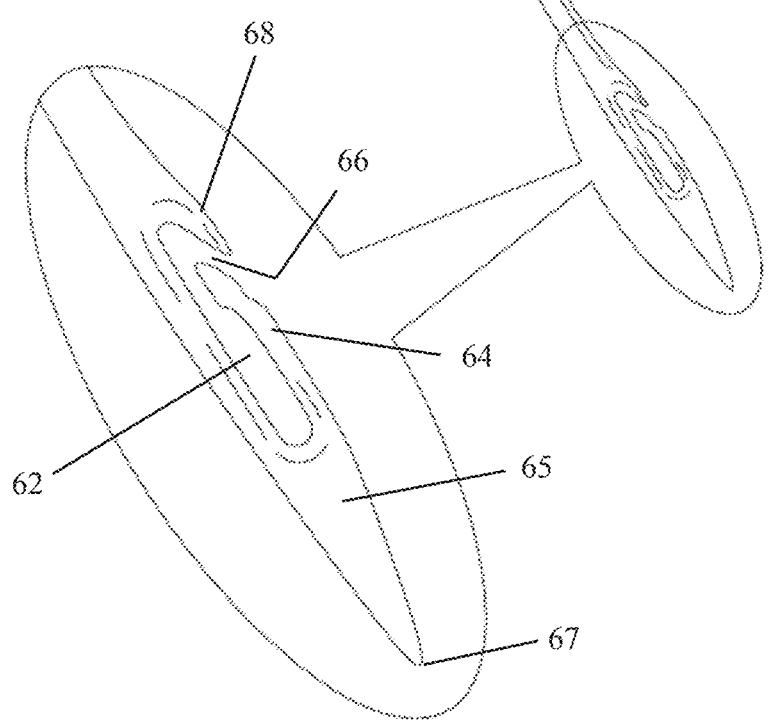
FIG. 6 is a simplified illustration of a different kind of snaring or hook tool, in accordance with a non-limiting embodiment of the invention.

Reference is now made to FIG. 6, which illustrates a different kind of hook or snaring tool 60, in accordance with a non-limiting embodiment of the invention. The hooking portion of hook tool 60 may be constructed as a type of slit needle eye 62, which is elongate and bounded by a tongue portion 64 separated by a gap 66 from a heel portion 68, which extends from the shaft 61 of the hook tool (the shaft 61 being coupled to a handle 63). The heel portion 68 overlies the tongue portion 64. When the secondary haptic loop (not shown in FIG. 6) is placed through the gap 66 into the eye 62, the loop tends to stay in the eye 62 because it is somewhat trapped by the heel portion 68 overlying the tongue portion 64, which serves as a labyrinth to keep the loop in place. The distal end 65 of hook tool 60 (the end opposite the handle 63) may have a sharp point 67. Accordingly, the hook tool 60 provides a unique needle construction, because the end of the needle that has the eye has a sharp tip, in contrast with existing needles in which the end of the needle that has the eye is blunt.

Figure 7:
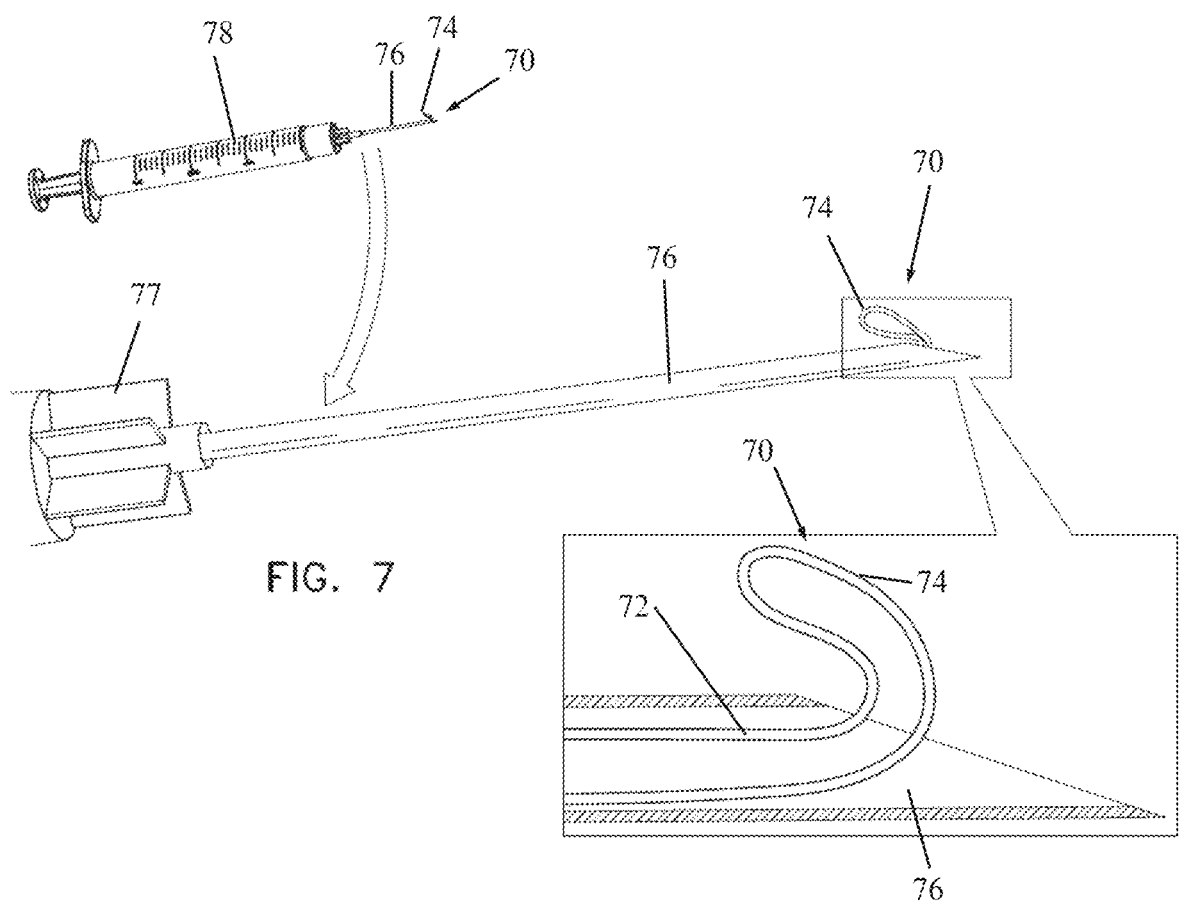
FIG. 7 is a simplified illustration of a tool for grasping the secondary haptic loop and pulling the loop through a sclerotomy, in accordance with a non-limiting embodiment of the invention.

Reference is now made to FIG. 7, which illustrates a grasping tool 70 for grasping the secondary haptic loop and pulling the loop through a sclerotomy, in accordance with a non-limiting embodiment of the snaring device. Tool 70 may include an elongate portion 72 which has a bent distal end 74, which is bent backwards towards the proximal end of the tool 72. Without limitation, the elongate portion 72 may be formed of a wire or double wires (e.g., parallel wires, as in a paper clip) and the bent distal end 74 may be formed as a bend of double wires. The elongate portion 72 may be disposed in a hollow shaft 76 of a syringe needle 78, and coupled to a needle hub (or Luer lock) 77 of the syringe needle 78. Without limitation, the bent distal end 74 may be made of nitinol.

Figure 8:
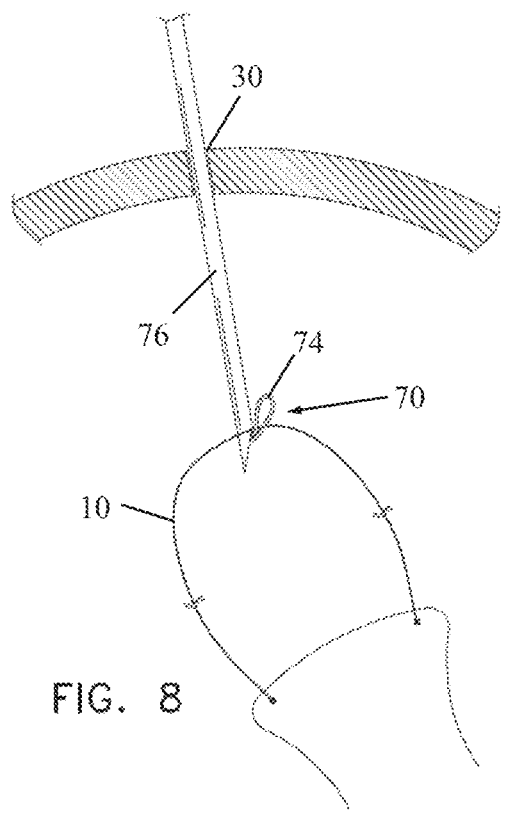
FIGS. 8 and 9 are simplified illustrations of using the tool of FIG. 7 to grasp the secondary haptic loop and pull the loop through the sclerotomy, in accordance with a non-limiting embodiment of the invention.
Figure 9:
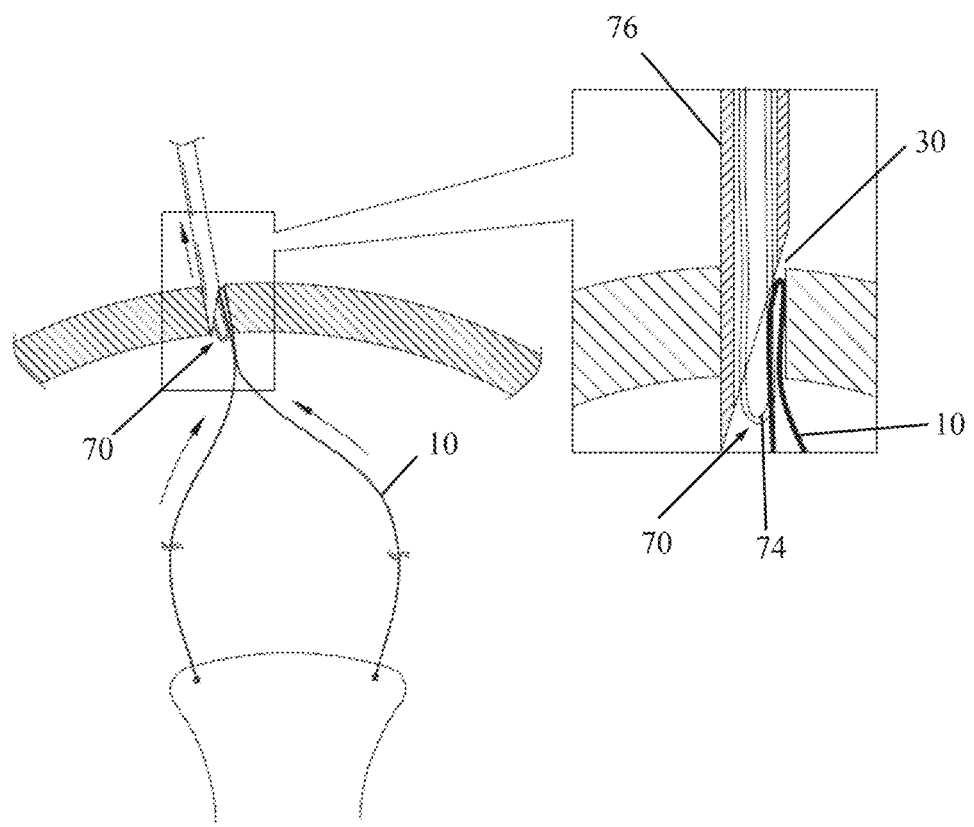

Reference is now made to FIGS. 8 and 9. In FIG. 8, grasping tool 70 grasps secondary haptic loop 10, with loop 10 being snared by bent distal end 74. In FIG. 9, grasping tool 70 pulls the secondary haptic loop 10 through sclerotomy 30 with loop 10 being snugly pressed by bent distal end 74 against the inner wall of sclerotomy 30, so that the loop 10 is successively pulled through the sclerotomy 30 without falling off grasping tool 70.

What is claimed is:

1. An intraocular assembly comprising:
   an intraocular device that comprises at least one haptic; and
   a secondary haptic loop comprising two ends that are coupled to said at least one haptic, said secondary haptic loop being made of a material which can be tied, and wherein before insertion into an eye, said secondary haptic loop extends outwards away from said at least one haptic as a continuous loop without free ends.

2. The intraocular assembly according to claim 1, wherein said ends of said secondary haptic loop pass from a first side of said at least one haptic through apertures formed in said at least one haptic to a second side of said at least one haptic, and comprising a separate blocking structure for each of said ends, each of said separate blocking structures being configured to prevent said secondary haptic loop from being pulled out of said aperture.

3. The intraocular assembly according to claim 1, wherein each of said separate blocking structures comprises a flange or bulb.

4. The intraocular assembly according to claim 1, wherein said ends of said secondary haptic loop are formed integrally as part of said at least one haptic.

5. The intraocular assembly according to claim 1, wherein said intraocular device comprises more than one haptic, and at least one of said secondary haptic loops protrudes further away from its haptic than others of said secondary haptic loops.

6. The intraocular assembly according to claim 1, further comprising a hook tool that has a handle at a proximal portion thereof, said hook tool comprising a hooking portion that includes a slit needle eye, which is bounded by a tongue portion separated by a gap from a heel portion that extends from a shaft of said hook tool, wherein said heel portion overlies said tongue portion, and wherein a distal end of said hook tool has a sharp needle point.

7. The intraocular assembly according to claim 1, further comprising a grasping tool comprising an elongate portion which has a bent distal end, which is bent backwards towards a proximal end of said grasping tool, and wherein said elongate portion is disposed in a hollow shaft of a syringe needle.

8. The intraocular assembly according to claim 2, wherein said at least one haptic comprises a plurality of haptics, one of which is called a first haptic, and said separate blocking structures of the ends of said secondary haptic loop which is coupled to said first haptic is formed on an anterior side of said first haptic, and said separate blocking structures of the ends of said secondary haptic loop which is coupled to another one of said plurality of haptics which is not said first haptic, is formed on a posterior side of said other haptic.

* * * * *